(12) United States Patent
Mouyiaris et al.

(10) Patent No.: US 8,769,880 B2
(45) Date of Patent: Jul. 8, 2014

(54) PORTABLE BARRIER

(71) Applicants: Nikos Mouyiaris, Long Island City, NY (US); Qizhong Guo, Belle Mead, NJ (US)

(72) Inventors: Nikos Mouyiaris, Long Island City, NY (US); Qizhong Guo, Belle Mead, NJ (US)

(73) Assignee: Nikos Mouyiaris, Long Island City, NY (US)

( * ) Notice: Subject to any disclaimer, the term of this patent is extended or adjusted under 35 U.S.C. 154(b) by 0 days.

(21) Appl. No.: 13/827,006

(22) Filed: Mar. 14, 2013

(65) Prior Publication Data

US 2013/0227895 A1   Sep. 5, 2013

Related U.S. Application Data

(63) Continuation-in-part of application No. 13/493,831, filed on Jun. 11, 2012, now abandoned, which is a continuation of application No. 11/899,640, filed on Sep. 7, 2007, now Pat. No. 8,196,357.

(51) Int. Cl.
    *E04B 1/34*   (2006.01)
(52) U.S. Cl.
    USPC ............................................ 52/2.11; 52/79.5
(58) Field of Classification Search
    USPC ............... 52/2.11, 2.17, 2.19, 2.21, 2.22, 79, 52/79.5, 578
    See application file for complete search history.

(56) References Cited

U.S. PATENT DOCUMENTS

| | | | | |
|---|---|---|---|---|
| 2,916,058 | A | * | 12/1959 | Unthank ........................ 141/48 |
| 3,205,106 | A | * | 9/1965 | Cross ............................. 156/79 |
| 3,227,169 | A | * | 1/1966 | Fischer ......................... 52/2.19 |
| 3,390,491 | A | * | 7/1968 | Hayden et al. ............... 174/379 |
| 3,629,875 | A | * | 12/1971 | Dow et al. ....................... 4/599 |
| 3,936,984 | A | * | 2/1976 | Yando ........................... 52/2.19 |
| 4,006,702 | A | | 2/1977 | St. Cyr |
| 4,607,655 | A | * | 8/1986 | Wagner et al. ............... 52/2.19 |
| 4,824,282 | A | | 4/1989 | Waldecker |
| 5,269,623 | A | | 12/1993 | Hanson |
| 5,493,816 | A | * | 2/1996 | Willemsen .................... 52/2.11 |
| 5,720,678 | A | * | 2/1998 | Korthauer .................... 473/415 |
| 6,223,903 | B1 | * | 5/2001 | Mansouri ..................... 206/600 |

(Continued)

FOREIGN PATENT DOCUMENTS

| | | | |
|---|---|---|---|
| CA | 2229525 A1 | 8/1999 | |
| JP | 2001317018 A | 11/2001 | |
| WO | 2005/090898 A1 | 9/2005 | |
| WO | WO 2005090898 | * 9/2005 | ............. F42D 5/045 |

OTHER PUBLICATIONS

International Search Report, in related international application PCT/US2008/010408, mailed on Nov. 25, 2008.

(Continued)

*Primary Examiner* — Brian Glessner
*Assistant Examiner* — Adam Barlow
(74) *Attorney, Agent, or Firm* — Day Pitney LLP; Brian R. Pollack

(57) ABSTRACT

A portable and collapsible barrier that is lightweight and can be easily transported and erected. The barrier includes a base, a top and an enclosed volume such as a diaphragm that can be expanded with a medium such as a gas or liquid to a desired shape. The expanded volume will act as a barrier. When a series of expanded barriers are connected, they will form a wall that can contain bulk materials or liquids.

18 Claims, 9 Drawing Sheets

(56) References Cited

U.S. PATENT DOCUMENTS

| | | | |
|---|---|---|---|
| 6,332,290 B1* | 12/2001 | Delamare | 52/2.22 |
| 6,467,221 B1* | 10/2002 | Bigelow | 52/2.17 |
| 6,641,329 B1 | 11/2003 | Clement | |
| 7,963,075 B2* | 6/2011 | Howland | 52/202 |
| 2004/0040971 A1* | 3/2004 | Athalye | 220/666 |
| 2004/0047688 A1 | 3/2004 | Clement | |
| 2007/0237586 A1* | 10/2007 | Prestininzi | 405/115 |
| 2007/0243021 A1* | 10/2007 | Tyler | 405/115 |
| 2008/0087676 A1* | 4/2008 | Kasboske | 220/666 |

OTHER PUBLICATIONS

International Preliminary Report on Patentability together with Written Opinion, in related international application PCT/US2008/010408, mailed on Nov. 25, 2008.

* cited by examiner

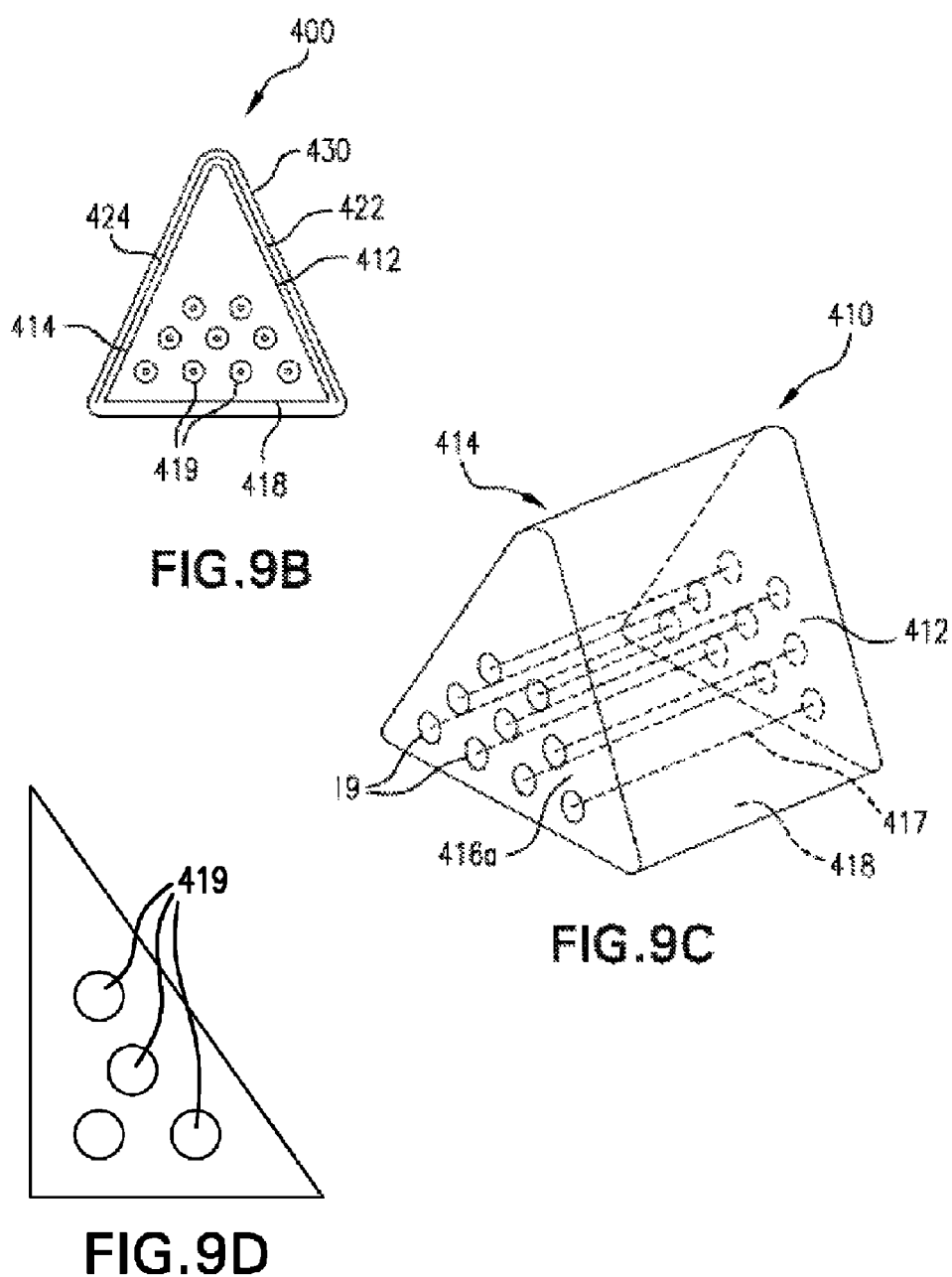

US 8,769,880 B2

PORTABLE BARRIER

CROSS-REFERENCE TO RELATED CASES

This patent application is a continuation-in-part of and claims the benefit of priority to U.S. patent application Ser. No. 13/493,831, filed Jun. 11, 2012, which in turn is a continuation of and claims the benefit of priority to U.S. patent application Ser. No. 11/899,640, filed Sep. 7, 2007. Each of the aforementioned patent applications is incorporated by reference herein in its entirety for any purpose whatsoever.

BACKGROUND OF THE DISCLOSURE

1. Field of the Disclosure

The embodiments described herein relate to a portable and collapsible barrier unit that is lightweight and can be easily transported and erected. The barrier unit includes a diaphragm that can be expanded with a medium to a desired shape that will act as a barrier. Each barrier unit can be used alone or with other barrier units to create a wall.

2. Description of the Related Art

Different types of portable barriers exist for different situations. For example, saw horses or metal gates are sometimes used to contain crowds. A problem with saw horses, metal gates and other similar barriers is they can not contain bulk materials and liquids such as soil, grain or water. Such bulk materials and liquids require barriers that, for example, can span large distances, can hold back the weight of bulk materials and liquids and do not have any holes that would allow the bulk materials or liquids to pass through the barrier.

SUMMARY OF THE DISCLOSURE

The embodiments described herein include a portable, collapsible, lightweight barrier unit. Each barrier unit has a rigid base, which can be a carrying case with a top, and an inflatable enclosed volume such as a flexible diaphragm that rests on the base. The side walls of the volume can have any constructions such as an accordion-like construction. The volume can be secured to the base. The volume will have an inlet hole through which a medium such as a gas or liquid can be pumped into the volume to inflate the volume. When the volume is inflated, the volume will act as a barrier for holding back bulk materials or liquids. Each barrier unit can be anchored using, for example, ballast.

A number of barrier units can be connected together to form a wall or corral. The barriers can be connected using any conventional techniques. The barrier units can be sealed together using any conventional technique to prevent bulk materials or liquids from seeping between the barrier units. The barrier units can also be sealed to the ground to prevent the bulk materials or liquids from seeping underneath the barrier units. Each enclosed volume of each barrier unit can be connected to separate mediums sources or can be connected in parallel to the same medium source. In addition, the volumes of the barrier units can be connected in series so the medium enters one volume to inflate that volume and then can exit that volume and enter the next volume to inflate that volume and then continue on to the other volumes.

BRIEF DESCRIPTION OF DRAWINGS

The accompanying drawings illustrate the embodiments described herein and, together with the Detailed Description below, help to describe the embodiments. The reference numerals in the drawings refer to the same or like elements and are used in the Detailed Description to refer to the same or like elements. Below are brief descriptions of the drawings:

FIGS. 9A-9D illustrate views of further embodiments of a portable barrier in accordance with the disclosure.

DETAILED DESCRIPTION OF THE PREFERRED EMBODIMENTS

Figure 1:
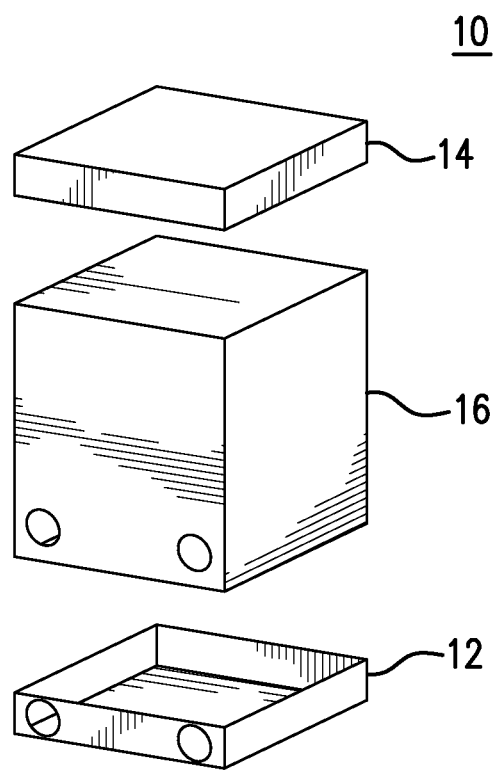
FIG. 1 is an exploded view of the portable barrier unit in accordance with an embodiment of the present disclosure.

FIG. 1 illustrates several components of a portable barrier unit 10. Barrier unit 10 consists of a rigid base 12, a rigid top 14 and an expandable volume or flexible diaphragm 16.

Figure 2:
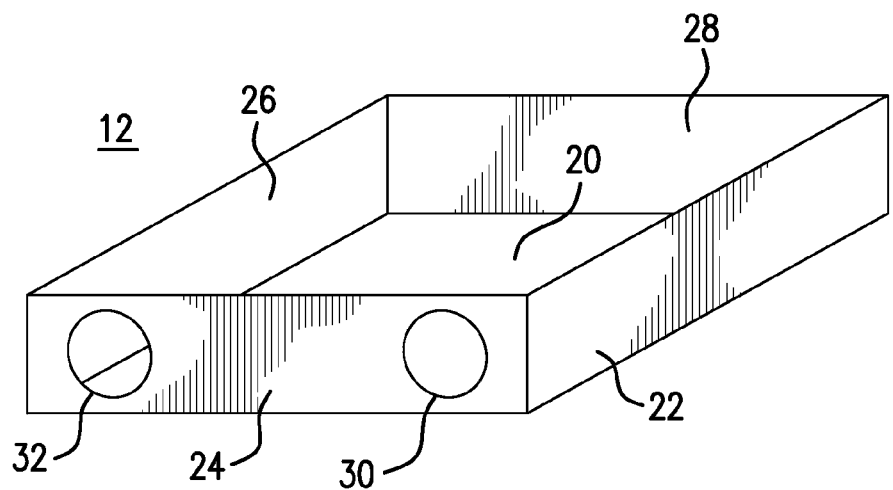
FIG. 2 is a perspective view the base of the portable barrier unit in accordance with an embodiment of the present disclosure.

FIG. 2 illustrates base 12. Base 12 has a bottom 20 and four side walls 22, 24, 26, 28, all of which form a tray-like structure with an open top. Side wall 24 has an inlet hole 30 and an outlet hole 32.

Figure 3:
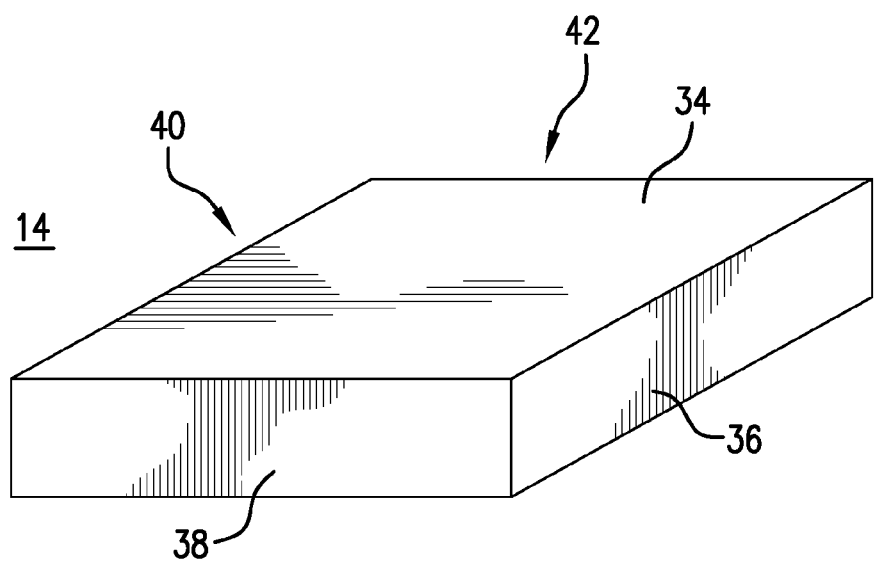
FIG. 3 is a perspective view the top of the portable barrier unit in accordance with an embodiment of the present disclosure.

FIG. 3 illustrates top 14. Top 14 has a top 34 and four side walls 36, 38, 40, 42, all of which form an upside down tray-like structure with an open bottom.

Base 12 and top 14 can be made out of any lightweight, rigid material. One such material is plastic. In addition, base 12 and top 14 can be of any construction that will allow the expandable volume or flexible diaphragm 16 to easily expand or inflate without tipping over. Both base 12 and top 14 can be of any construction as long as they help to stabilize the expandable volume or flexible diaphragm 16 while it expands or inflates.

The base 12 and/or other surfaces of the barrier can be further provided with a high friction layer 11 to enhance the gripping between the base and the ground, or between adjacent barriers. Such a material can include rubber, synthetic rubber, elastomeric material, and the like. Enhancing the gripping force between the barrier and the ground, and/or other barriers can result in the barriers being able to resist greater forces, or permitting smaller barriers to be used for a given force.

If desired, the high friction layer can also include a roughened surface to further increase the frictional resistance, even for a given type of material (e.g., rubber, plastic metal). For example, a sheet or panel of a roughened material can be attached to the bottom of the barrier, or laminated or coated onto the bottom surface of the barrier. For example, such a surface can include downwardly protruding spikes, fingers, and/or ridges, and the like.

It is also helpful to ensure that the bottom of the barrier conform to the surface on which it is located in order to minimize seepage past a wall formed of the barriers. This can be achieved by making the base of the barrier of a material that is conformable to the surface. The conformance can be enhanced by not filling the barrier with water or other fluid beyond a point wherein portions of the bottom of the barrier separate from the ground due to inflation pressure. This will increase the frictional resistance and reduce the water seepage underneath the barrier. Seepage proximate the base of the barrier can further be reduced by using a layer of conformable sealing material on the bottom of the barrier (e.g., closed-cell foam or similar material), and/or an apron or skirt 11a proximate to the front face of the barrier in direct contact with the flood water. If desired, such an apron can be configured to be driven into the ground surface below the flood water, and will also help to reduce or eliminate uplifting hydrostatic pressure at the bottom of the barrier.

Base 12 and top 14 can be designed to act as a carrying case for the expandable volume or flexible diaphragm 16. In such case, the side walls 22, 24, 26, 28 of base 12 may fit over or engage the side walls 36, 38, 40, 42 of top 14 in any conventional manner. For example, side walls 22, 24, 26, 28 may have a male lip around their top edges and side walls 36, 38, 40, 42 may have a female lip around their top edges. When top 14 is placed on base 12, the two sets of lips engage one another to hold top 14 and base 12 together. Another example is each side wall 22, 24, 26, 28 may have a male portion of a latch at their top edges and each side wall 36, 38, 40, 42 may have a female portion of a latch at their top edges. When top 14 is placed on base 12, the two sets of side walls abut against one another and the latches, when engaged, hold top 14 and base 12 together.

Figure 4:
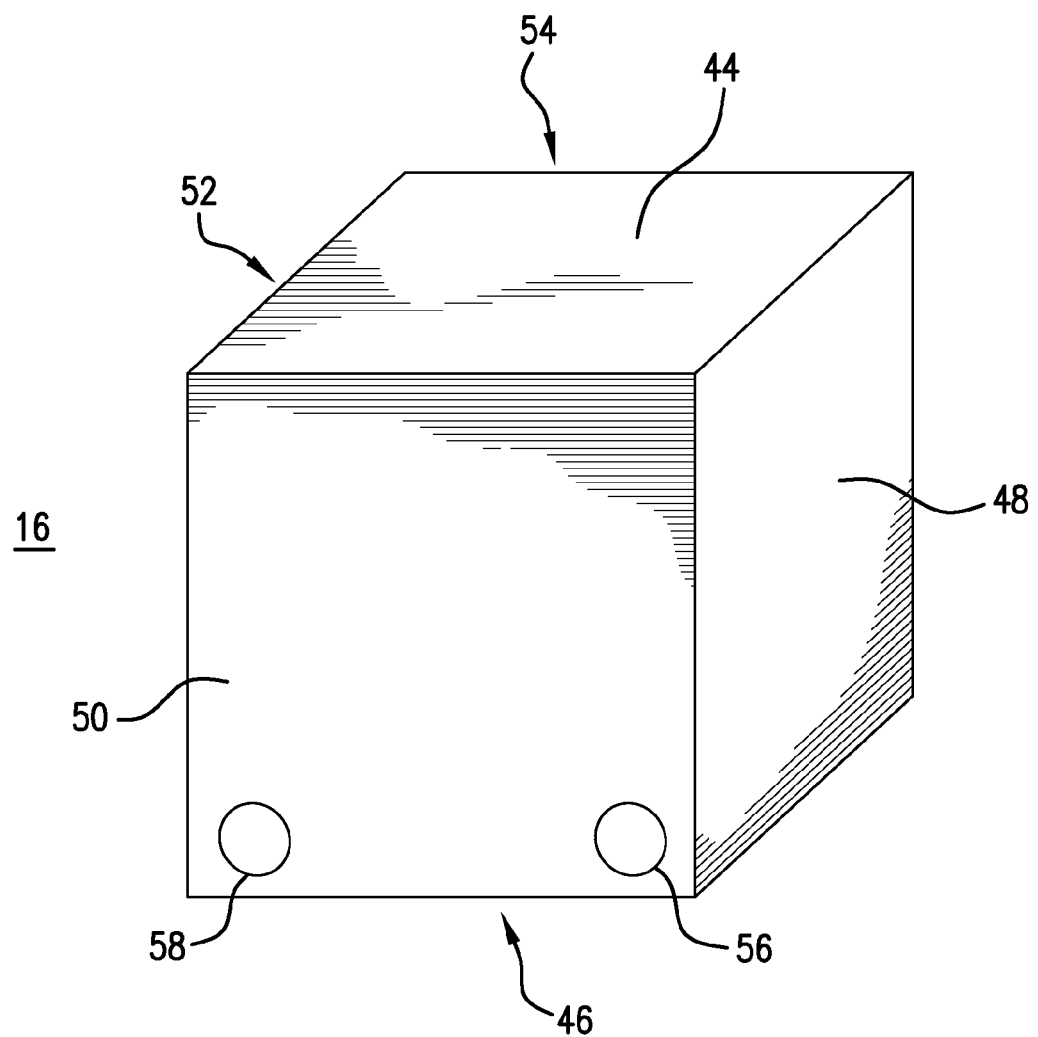
FIG. 4 is a perspective view the diaphragm of the portable barrier unit in accordance with an embodiment of the present disclosure.

FIG. 4 illustrates the expandable volume or flexible diaphragm 16. Diaphragm 16 forms an enclosed volume by itself of in conjunction with the base 12 and top 14. Diaphragm 16 can be an enclosed box shape with a top 44, a bottom 46 (not shown) and four side walls 48, 50, 52 (not shown), 54 (not shown). In addition, diaphragm 16 can have an inlet hole 56 and an outlet hole 58. In some embodiments, diaphragm 16 may not have a top 44 or a bottom 46. Diaphragm 16 is made out of any material that is flexible and that can expand but is preferably a lightweight material such as vinyl.

The bottom of diaphragm 16 fits into or is secured to base 12 and the top of diaphragm 16 fits into or is secured to top 14. Diaphragm 16 can be secured into base 12 and top 14 using any conventional means such as fasteners, glue or form fit techniques. If side walls 48, 50, 52, 54 of diaphragm 16 are sealed to side walls 22, 24, 26, 28 of base 12 and side walls 36, 38, 40, 42 of top 14, then diaphragm 16 does not need its top 44 or bottom 46 since top 14 and base 12 will acts as the top and bottom of diaphragm 16.

When the bottom of diaphragm 16 is inserted into base 12, inlet hole 56 and outlet hole 58 of diaphragm 16 will line up with inlet hole 30 and outlet hole 32 of base 12, respectively. Inlet hole 56 and outlet hole 58 of diaphragm 16 and inlet hole 30 and outlet hole 32 of base 12 will be connected and sealed together using any conventional means. For example, inlet hole 56 and outlet hole 58 of diaphragm 16 may have extra material that is pulled through inlet hole 30 and outlet hole 32 of base 12, respectively, and a ring is placed around inlet hole 30 and outlet hole 32 of base 12. Another example is inlet hole 56 and outlet hole 58 of diaphragm 16 may have extra material that is pulled through inlet hole 30 and outlet hole 32 of base 12, respectively, and glued to side 24 of base 12.

The cross-sectional shape of barrier unit 10 and, thus, of base 12, top 14 and expandable volume or flexible diaphragm 16, is a square. The cross-sectional shape of barrier unit 10, however, can be any shape such as a circle, oval, rectangle, triangle or any other polygon or circular shape.

Expandable volume or flexible diaphragm 16 is an enclosed volume that acts like a balloon. Diaphragm 16 begins in a collapsed state. A medium such as water or air (not shown) is pumped into inlet hole 30 using any conventional means such as a pump or air compressor. Outlet hole 32 is closed or topped using any conventional means so that the interior of diaphragm 16 is sealed and no medium can escape from outlet hole 32. As more and more medium enters the interior of diaphragm 16, diaphragm 16 will expand or inflate. When diaphragm 16 has fully expanded, diaphragm 16 will form a rectangular column, as shown in FIG. 1.

Figure 5:
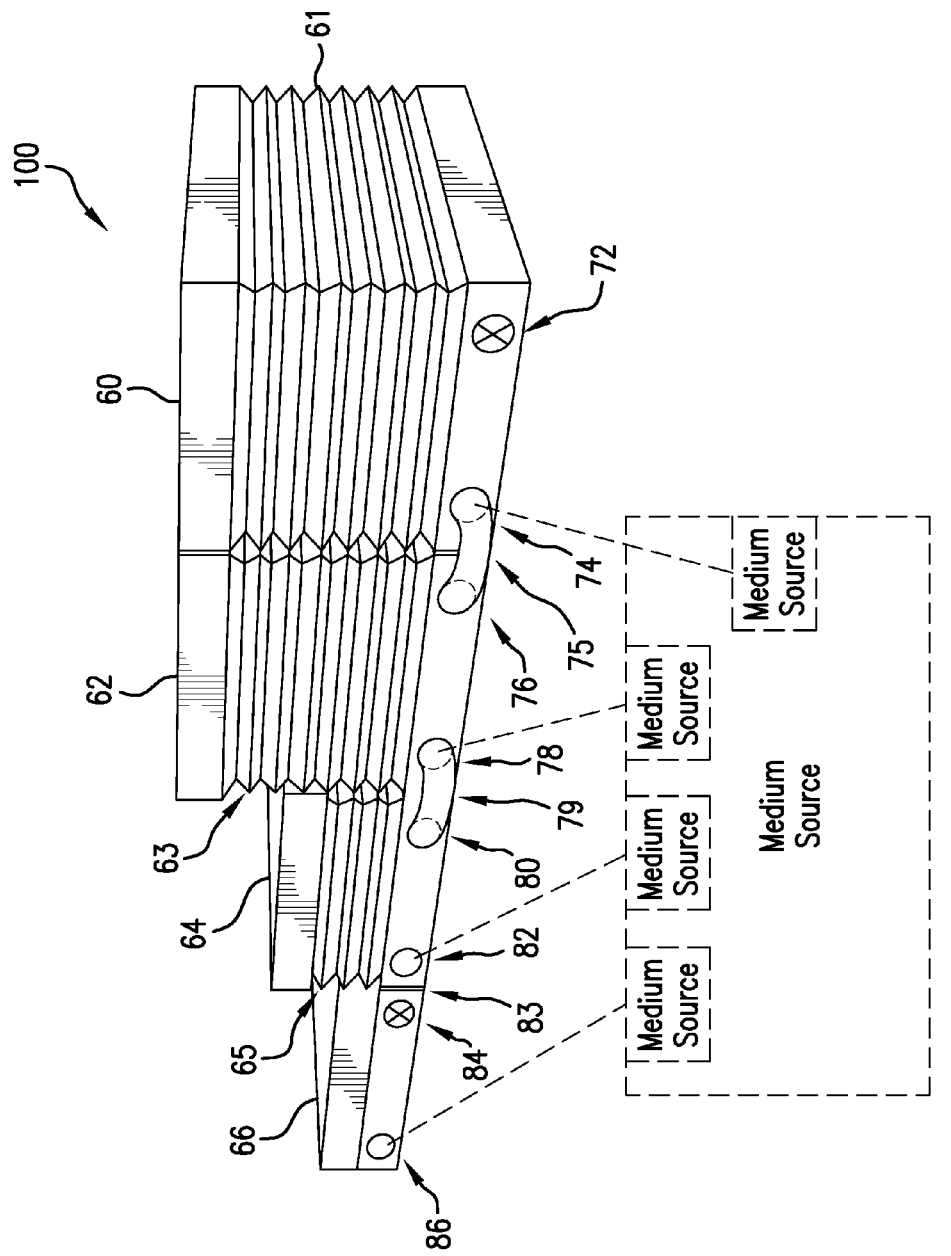
FIG. 5 is a perspective view of a series of portable barrier units in accordance with an embodiment of the present disclosure.

Expandable volume or flexible diaphragm 16 can be of any construction that will allow diaphragm 16 to be carried inside base 12 and top 14 and to expand upward. As shown in FIGS. 1-4, diaphragm 16 is a box shape constructed of flexible material. FIG. 5 illustrates a number of barriers with diaphragms that have accordion-like side walls. As shown in FIG. 5, barrier unit 60 has an accordion-like diaphragm 61, barrier unit 62 has an accordion-like diaphragm 63, and barrier unit 64 has an accordion-like diaphragm 65. Barrier unit 66 also has an accordion-like diaphragm but the diaphragm is not shown since barrier unit 66's top is on its base in a closed position. The accordion-like diaphragms can be made of any material that are flexible enough to expand but stiff enough to fold up in an accordion-like fashion. In addition, the accordion-like diaphragms can be constructed without a bottom and a top in a manner previously described above. If the diaphragms do not have a top or bottom, the sides of the diaphragms will need to be secured and sealed to the bases and tops to create an enclosed volume.

In operation, barrier unit 10 is transported in a closed position. Next, barrier unit 10 is placed in a site where a barrier needs to be erected. Next, a medium such as water or air (not shown) is pumped into inlet holes 30, 56 using any conventional means such as a pump or air compressor while outlet holes 32, 58 are closed or topped using any conventional means so that the interior of expandable volume or flexible diaphragm 16 is sealed and no medium can escape from outlet holes 32, 58. As more and more medium enters the interior of diaphragm 16, diaphragm 16 will begin to expand or inflate. As diaphragm 16 expands, diaphragm 16 will lift top 14 upwards off of base 12. When diaphragm 16 has fully expanded, the pumping of the medium is stopped. When use of the barrier is complete, the medium is let out of diaphragm 16 by opening outlet holes 32, 58. When diaphragm 16 is collapsed, diaphragm 16 is packed into base 12, and top 14 is placed back onto base 12. Thus, barrier unit 10 can be transported to another site and reused.

Any medium can be used as long as it is suitable for the intended use of barrier unit 10. For example, air as a medium may not be heavy enough to allow barrier unit 10 to hold back heavy bulk products such as coal. In such cases, the barrier unit 10 can be anchored using conventional techniques such as using rocks or weights as ballast in base 12 to hold barrier unit 10 in place. Alternatively, a heavier medium such as water can be used and ballast may not be necessary. Inlet holes 30, 56 and outlet holes 32, 58 can be connected to any type of valve and/or pump depending on the use of barrier unit 10 and the medium pumped into barrier unit 10.

FIG. 5 illustrates a number of barrier units connected together in series to form a barrier system or wall too. Barrier unit 60 is placed next to barrier unit 62. Barrier unit 62 is placed next to barrier unit 64. Barrier unit 64 is placed next to barrier unit 66. The barriers can be connected to one another using any conventional means such as latches, tape or straps.

Figure 6:
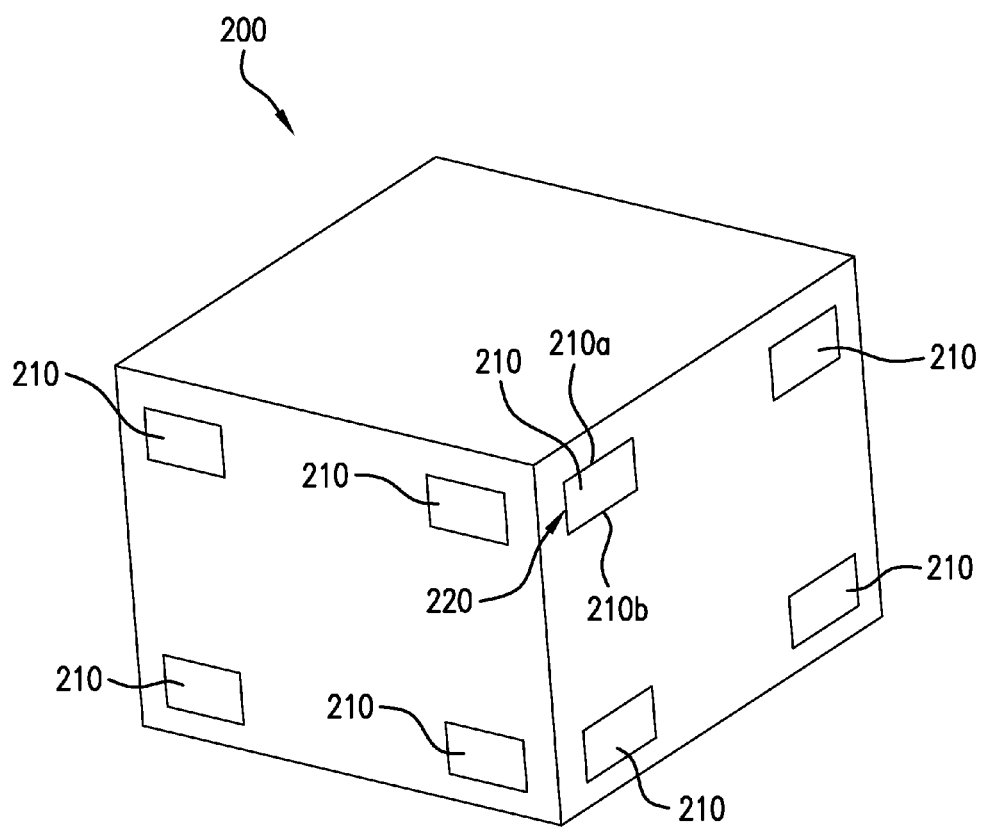
FIG. 6 is a perspective view of an alternative embodiment of a portable barrier unit in accordance with the disclosure.
Figure 7:
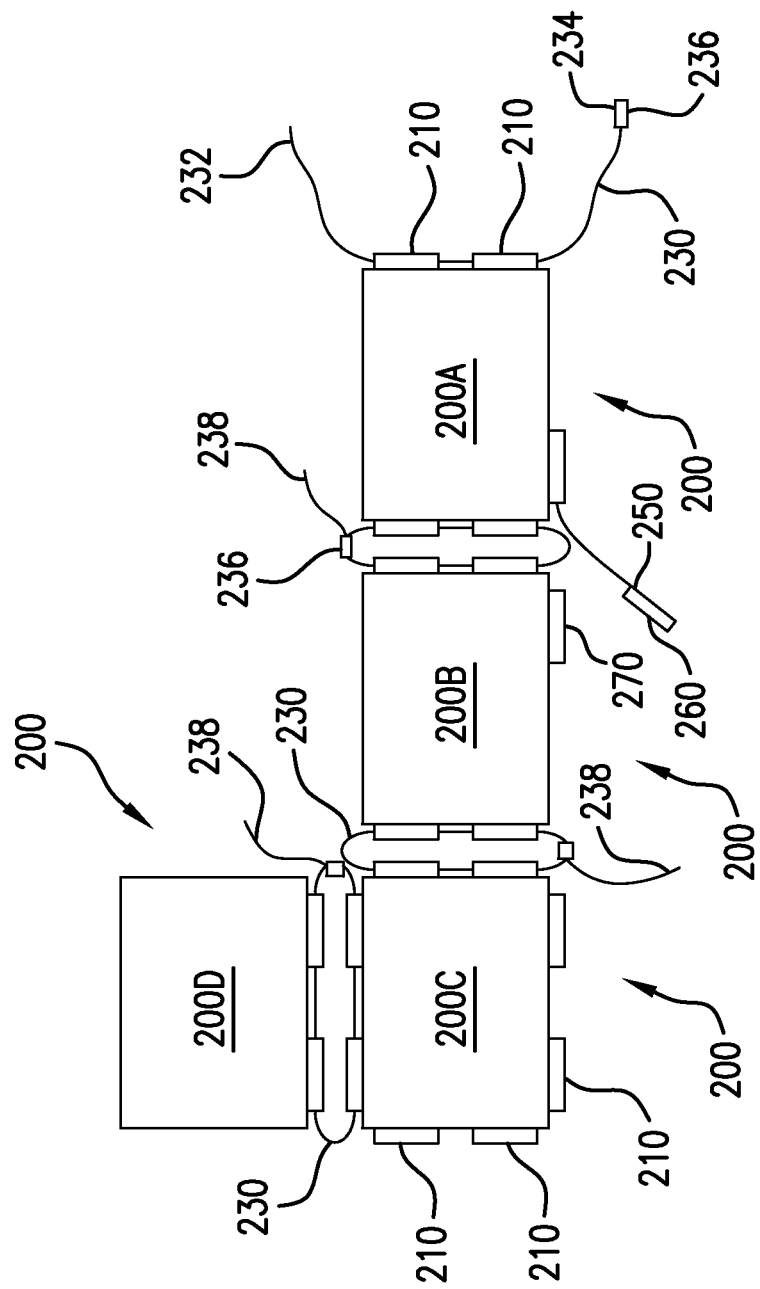
FIG. 7 is a top view of a series of assembled portable barrier units in accordance with the disclosure.

For example, as illustrated in FIG. 6, an alternative embodiment of a portable barrier unit 200 is illustrated. While similar to the earlier embodiment, the illustrated embodiment includes a plurality of sleeves or conduits 210 having upper and lower peripheries 210a, 210b that are attached to the sidewall of the barrier unit 200. FIG. 7 illustrates a top view of a plurality of portable barrier units 200 each equipped with sleeves 210 on at least two vertical faces. For example, units 200A and 200B have four outwardly facing sleeves on each of two sides arranged in a manner as illustrated in FIG. 6, such that each of units 200A and 200B have eight sleeves. Unit 200C has four sleeves on each vertical face, while barrier 200d has four sleeves 210 on only one vertical face. It will be appreciated that while four sleeves are illustrated in two rows of two sleeves, any suitable number of sleeves in any suitable number of rows may be used.

With further reference to FIG. 7, adjacent barrier units 200 are connected to each other via straps 230 that are routed through adjacent sleeves 210 of successive barrier units 200. As illustrated, each strap 230 has a first end 232, a second end 234, and a buckle 236. Thus, unit 200A is connected to unit 200B via one or more straps 230 that are routed through sleeves on the top of each barrier unit 200 and/or on the bottom of each barrier unit 200. Extra strap 238 that passes through the buckle can be left hanging or can be tucked back into a nearby sleeve 210, as desired. Units 200B and 200C are attached in a manner similar to units 200A and 200B, while units 200C and 200D are attached along a direction that is generally orthogonal to the linear arrangement of units 200A, 200B and 200C.

It will be appreciated that a variety of other fixation techniques can be used to attach units 200 to each other, such as hook and loop fasteners on the barrier units themselves, or on large straps (e.g., 250) including hook and loop fastener 260 that mates with a landing area 270 on an adjacent barrier unit as illustrated in FIG. 7.

In one embodiment, barriers can be filled and then attached to an unfilled barrier unit by way of the fastener (e.g., straps). The newly attached unfilled barrier can be filled, and then the process can be repeated to form the entire barrier system.

In operation, barriers 60, 62, 64 and 66's inlet and outlet holes are connected to allow the medium to flow from one diaphragm to another diaphragm. Inlet hole 72 of barrier unit 60 is connected to a source of a medium such as a water pump using any conventional means such as a pipe. As the medium is pumped into expandable volume or flexible diaphragm 61 of barrier unit 60, diaphragm 61 will expand.

Outlet hole 74 of barrier unit 60 is connected to inlet hole 76 of barrier unit 62 by a pipe 75. As the medium is pumped into expandable volume or flexible diaphragm 61 of barrier unit 60, at some point such as when diaphragm 61 is fully expanded, the medium will flow through pipe 75 into expandable volume or flexible diaphragm 63 of barrier unit 62.

Outlet hole 78 of barrier unit 62 is connected to inlet hole 80 of barrier unit 64 by a pipe 79. As the medium is pumped into expandable volume or flexible diaphragm 63 of barrier unit 62, at some point such as when diaphragm 63 is fully expanded, the medium will flow through pipe 79 into expandable volume or flexible diaphragm 65 of barrier unit 64.

Outlet hole 82 of barrier unit 64 is connected to inlet hole 84 of barrier unit 66 by a pipe 83. As the medium is pumped into expandable volume or flexible diaphragm 65 of barrier unit 64, at some point such as when diaphragm 65 is fully expanded, the medium will flow through pipe 83 into expandable volume or flexible diaphragm (not shown) of barrier unit 66.

Outlet hole 86 of barrier unit 66 is closed and sealed to prevent any medium from escaping the diaphragm of barrier unit 66 and also from escaping barrier system 100. When the diaphragms of barriers 60, 62, 64, 66 are expanded, their side walls that abut one another will push against each other to form a continuous surface or wall. Thus, barriers 60, 62, 64, 66 will form a rectangular wall that can act as a barrier for large bulk materials and liquids.

One can connect as many barriers as one desires to construct a wall of any length or to create a corral or holding area of any shape. When one connects the barriers, one may seal the barriers together using any conventional technique such as tape, foam or flexible inserts to prevent bulk materials and liquids from seeping between the barriers. In addition, one may seal the area around the base of the barriers to prevent bulk materials and liquids from seeping underneath the barriers. For example, one may embed the barriers in the ground or pile soil or sand against the base of the barriers to form the seal. Moreover, while barrier units having a square planform shape are illustrated as in FIG. 7, the planform area shape can also be triangular, octagonal, hexagonal, parallelogram, oval, circular and the like to permit formation of more complex and varied barriers using barrier units 300 having different shapes attached to by each other by straps or other means as illustrated in FIG. 8.

Figure 8:
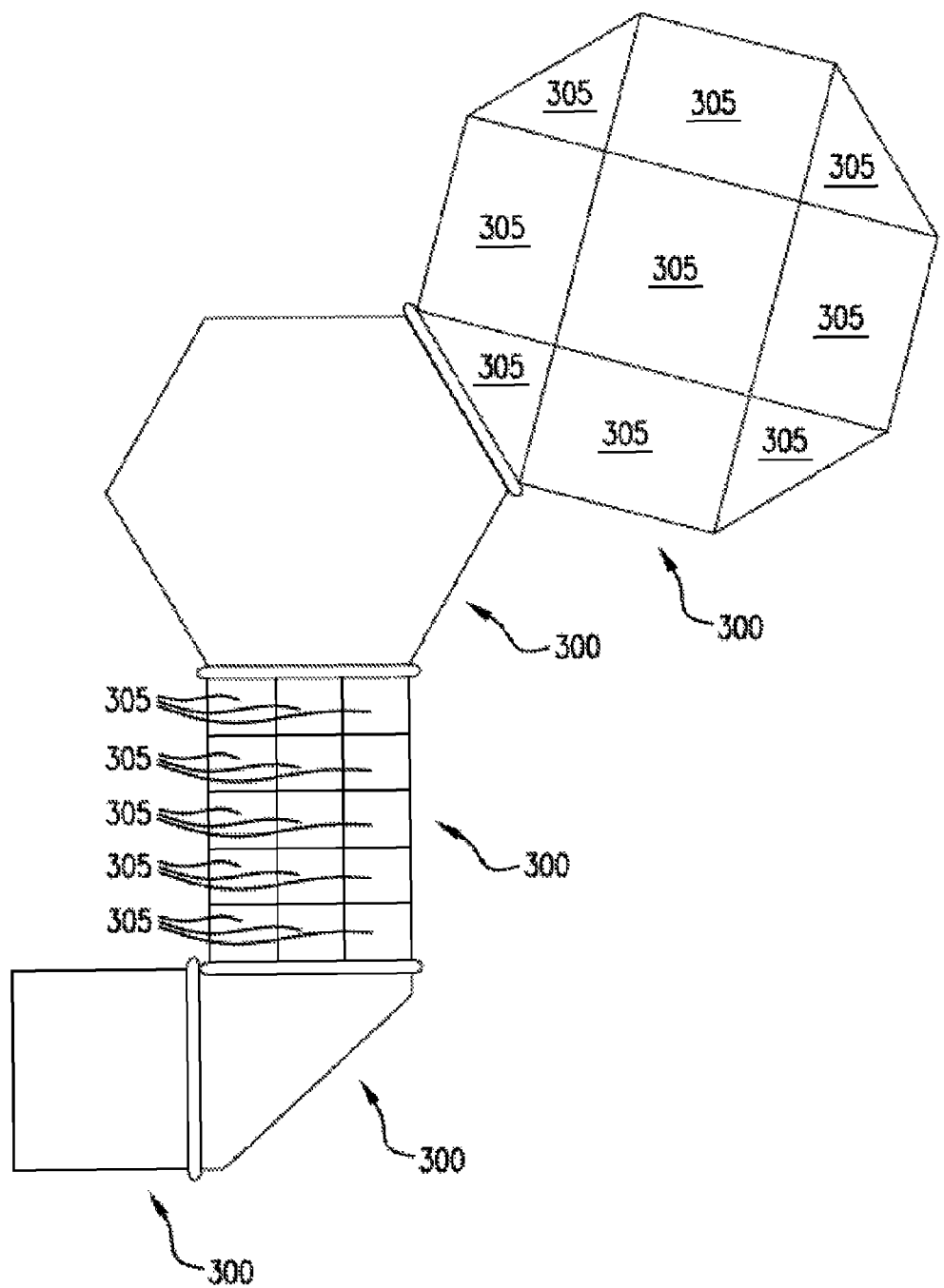
FIG. 8 is a top view of a second arrangement of assembled portable barrier units in accordance with the disclosure having different planform shapes.

In accordance with a further embodiment, as illustrated in FIG. 8, the portable barrier can be composed of a plurality of sub regions, such as tubes or cells 305 in fluid communication with each other that fill when the barrier is filled. Such a barrier construction can limit the degree of bulging of the barrier and maintain suitable alignment between adjacent barriers.

One may connect the inlet and outlet holes of the barriers in any fashion such as in series or in parallel. One may also not connect the inlet and outlet holes of the barriers. In such cases, the outlet holes are closed and the inlet holes are connect to one or more pumps or other devices that supply the medium to expand the diaphragms.

Sample applications of a series of barriers include: connecting a series of barriers together to act as a flood wall or to repair a hole in a levee or to retain bulk materials such as coal or rock salt in a specific area.

Depending on the application, the height of barrier unit 10 may be controlled using the medium or the height is pre-set. In general, the height of barrier unit 10 corresponds to the height of enclosed volume or flexible diaphragm 16's four side walls 48, 50, 52, 54. The height can be adjusted by pumping more or less medium into diaphragm 16. If diaphragm 16 is not fully expanded and is next to another diaphragm that is not fully expanded, then bulk material or liquid may be able to pass between the diaphragms. Therefore, in cases where the diaphragms must be fully expanded, the height of barrier unit 10 will be pre-set by constructing diaphragm 16's four side walls 48, 50, 52, 54 to be a pre-selected height that may be based on factors such as the size of the barrier wall or the amount of bulk material or liquid that needs to be contained.

Figure 9A:
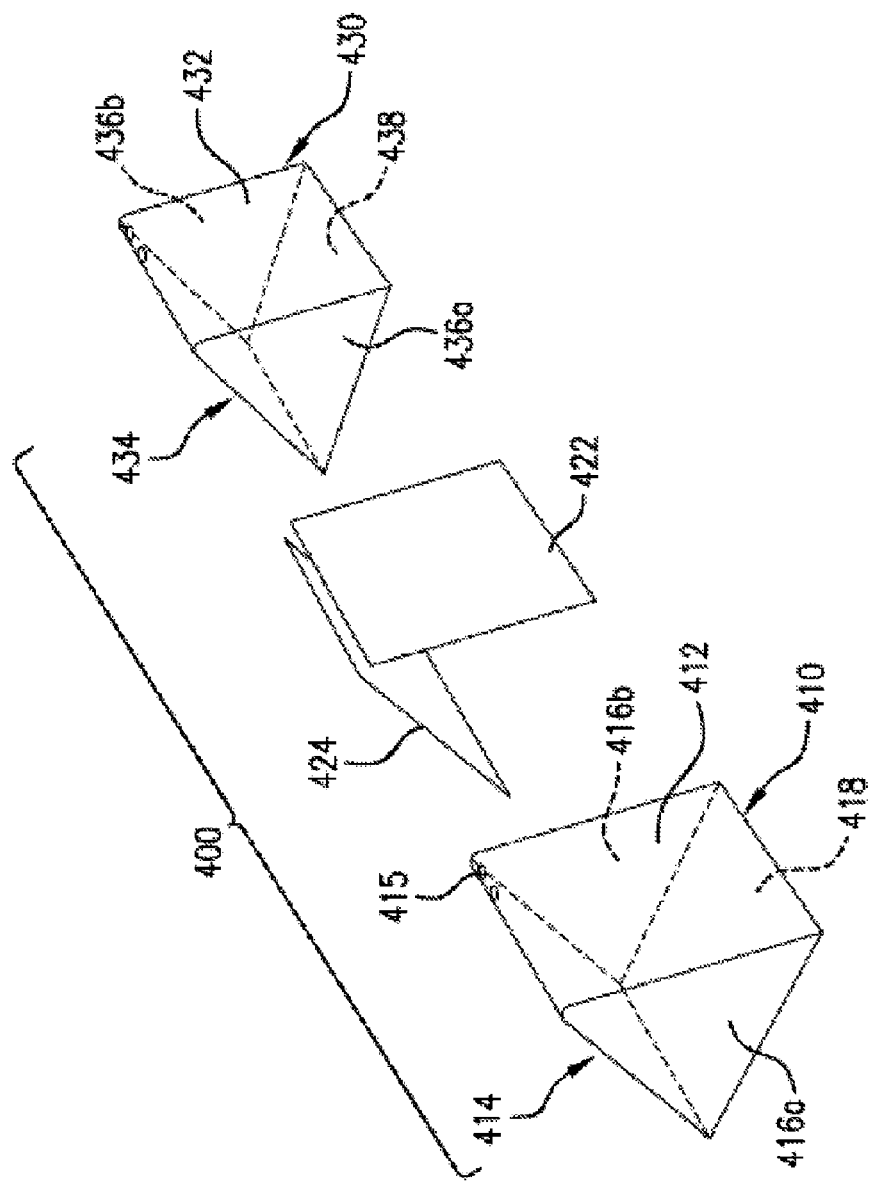

FIGS. 9A-9C illustrate a further embodiment of a portable barrier in accordance with the disclosure. FIG. 9A is an exploded view of the portable barrier, while FIGS. 9b-9c present schematic views of the portable barrier.

Most notably, the portable barrier of FIGS. 9A-9C have a generally triangular cross section wherein the top of the portable barrier unit coincides with the apex of the triangle. The particular embodiment illustrated is formed from an inner fluid containing envelope or bladder 410 situated within an outer protective covering 430.

As illustrated in FIG. 9A, inner bladder 410 includes a bottom face 418 that is connected at each of four sides to front and rear triangular panels 416a, 416b as well as side panels 412, 414. Side panels 412, 414 meet at a top, or apex of the bladder 410 where fill and/or drain valves 415 are situated. In order to prevent the front and rear sides 416a/416b from bulging outwardly, as illustrated in FIGS. 9B-9C, a plurality of tethers 419 are provided that span between the two panels from a reinforced region 419. The depicted barrier includes nine such reinforcements, but it will be appreciated that any suitable number of reinforcing members may be used. It will also be appreciated that the tethers and reinforced region can be used with any of the disclosed embodiments to help the portable barriers hold a predetermined shape. The tether can include anchor regions proximate the side panels of the barrier and a connecting portion 417 that connects the anchor regions. The connecting portion can be a cord. Alternatively, the tethers can be strips of material that are simply attached to an inner surface of the barrier by various attachment techniques such as ultrasonic welding and the like.

Interposed between the inner envelope 410 and the outer covering 430 are stiffening panels 422, 424 that help the assembly maintain its shape when filled with fluid (e.g., water). The panels can be stitched into the fabric forming the inner bladder 410, may be slid into pockets formed into walls 412, 414, or may otherwise be attached to walls 412, 414. Moreover, if desired, panels 422, 424 may simply be held in place by outer covering 430. Panels such as 422, 424 may be provided with respect to any of the disclosed embodiments to help maintain a predetermined shape.

Outer covering 430 similarly includes a bottom panel 438 that is connected to front and rear triangular panels 436 a, b and side panels 432, 434. Outer covering may additionally be provided with straps and sleeves to hold adjacent barriers together as with the embodiment of FIGS. 6-8.

While a barrier with an inner bladder and outer covering are depicted, it will be appreciated that an outer covering and stiffening members is not necessary, and that a variety of techniques can be used to form suitable barriers in accordance with the embodiment of FIG. 9. Of particular advantage, the sloped sides of the barriers help resist an incoming flow of water, such as from a tidal surge, by being bottom heavy and having a sloped surface to resist the incoming force. The barrier of FIG. 9 can be made from any desired materials as described herein. Panels 422, 424 can be made from any suitable material, such as ABS plastic or other suitable polymeric or composite, plywood, steel or other metals, and the like. By virtue of its design, the barrier of FIG. 9 can be stored in a collapsed format wherein the sloped sides come toward each other and the remainder of the barrier can be folded inwardly to rest between the two sides of the barrier.

Portable barriers can be sized in a variety of ways. In accordance with one embodiment, for a water-filled barrier of rectangular or triangular cross section used to block the water, the ratio of width of the cross section (front to back base width) over the height of the cross section can be between about 0.9 and about 0.5. More preferably, the ratio is between about 0.8 and 0.6. Still more preferably it is about 0.7. In another aspect, the ratio is at least about 0.6.

For a water-filled barrier having a rectangular vertical cross section used to block the water, to prevent a rectangular barrier from sliding, the ratio of width of the cross section (b) of the barrier (front to back) over the height of the cross section (h) of the barrier is preferably larger than one-half divided by the friction coefficient ($\mu$), such that $b/h > (\frac{1}{2})/\mu$. For a water-filled barrier with a triangular vertical cross section used to block the water, preferably $b/h > (\frac{2}{3})/\mu$. The coefficient of friction between the bottom surface of the barrier and the surface on which it is resting is preferably more than about 0.3, more preferably more than about 0.4, still more preferably more than about 0.5, still more preferably more than about 0.6, and still more preferably more than about 0.7.

To reduce the use of material use and further take advantage of the weight of outside water in stabilizing the water bag, a cross section of a right triangle can be used instead of the symmetrical triangle or the rectangle described hereinabove. A cross section of right triangular shape as applied to a barrier is as shown in FIG. 9D.

For a water bag of right triangular cross section, if the water will be acting on the water bag on the inclined face, the incipient overturning and sliding conditions will be the same as those for the water bag of rectangular cross section. The reason for this is that the water outside and above the inclined face of the water bag is been utilized to stabilize the water bag as well in addition to the water inside the water bag. Thus, for the same depth of water to be blocked, the less material will need to be used to make the water bag of right triangular cross section in comparison to the water bag of rectangular shape, reducing the material cost of the bag.

The right triangular shape also has an advantage over the symmetrical triangular shape in terms of material use since the required base width of the right triangle will be smaller than that of the symmetrical triangle.

The analyses above account only for hydrostatic force acting upon the side of the barrier. In accordance with further embodiments, if the uplifting hydrostatic force at the bottom of the barrier is significant, the dimensions of the barrier should be determined as set forth below.

Sizing of Water Bags of Rectangular Vertical Cross Section

For a water bag of rectangular cross section, for it not to overturn, the ratio of width (b) over the height (h) should be larger than one, that is, $$b/h > 1.0$$

This is larger than the number discussed above that does not consider the effects of uplifting hydrostatic pressure. For a water bag of rectangular cross section, for it not to slide, the ratio of width (b) over the height (h) should be larger than one over the friction coefficient, that is:

$$b/h > 1/\mu$$

This is twice that $(\frac{1}{2})/\mu$ without considering the uplifting hydrostatic pressure. If the friction coefficient is 0.5, then the width (b) should be at least twice the height (h).

Sizing of Water Bags of Symmetrical Triangular Vertical Cross Section

For a water bag of symmetrical triangular cross section, for it not to overturn, the ratio of width (b) over the height (h) should be larger than 1.33, that is, $$b/h > 1.33$$

This is more than twice that (0.6) without considering the uplifting hydrostatic pressure. For a water bag of symmetrical triangular cross section, for it not to slide, the ratio of width (b) over the height (h) should be larger than two over the friction coefficient, that is, $$b/h > 2/\mu$$

This is three times that $(\frac{2}{3})/\mu$ without considering the uplifting hydrostatic pressure. If the friction coefficient is 0.5, then the width (b) must be at least four times the height (h).

Sizing of Water Bags of Right Triangular Vertical Cross Section

The stability criteria for the water bag of right triangular cross section are the same as those for the water bag of rectangular cross section. That is, the width to height ratio will be the same, but use of the material will be less, as indicated above.

For an impervious ground surface such cement or asphalt surface, if the bottom of the barrier is sealed with respect to the ground surface, there will be no uplifting hydrostatic force acting on the bottom of the bag. However, if the impervious ground surface is not completely sealed or if the ground surface is pervious such as grass or soil, water will be in contact with the bag bottom and uplifting hydrostatic force can be expected to develop, resulting in the bag needing to be larger to account for the uplifting hydrostatic force.

The purpose of the foregoing description of the preferred embodiments is to provide illustrations of the embodiments described herein. The foregoing description is not intended to be exhaustive or to limit the disclosure to the precise forms disclosed. One of skill in the art will obviously understand many modifications and variations are possible in light of the above principles. The foregoing description explains those principles and examples of their practical applications. The foregoing description is not intended to limit the scope of the inventions that are defined by the claims below.

The invention claimed is:

1. A portable fillable barrier unit having a base and a plurality of walls, comprising:
   a) an inner envelope defining a volume to be filled;
   b) an outer covering at least partially surrounding the inner envelope;
   c) at least one stiffening panel configured to help the barrier unit maintain a predetermined shape when filled with a fluid medium; and
   d) at least one lateral tether coupling two opposing sides of the inner envelope to prevent a predetermined amount of physical separation of the two opposing sides after the inner envelope is filled with a liquid or solid medium, the at least one lateral tether being located proximate a central region of the two opposing sides of the inner envelope.

2. The portable barrier unit of claim 1, wherein the at least one stiffening panel is attached to the inner envelope.

3. The portable barrier unit of claim 2, wherein the at least one stiffening panel is attached to an outer surface of the inner envelope.

4. The portable barrier unit of claim 1, wherein the at least one stiffening panel is disposed in a pocket formed in an outer surface of the inner envelope.

5. The portable barrier unit of claim 1, wherein the at least one stiffening panel is held in place between the inner envelope and outer envelope by the outer covering.

6. The portable barrier unit of claim 1, wherein the inner envelope has a base panel, front and rear panels attached to opposing sides of the base panel that join at an apex to form the top of the portable barrier unit, and two opposing triangular side panels attached to the base, front and rear panels, wherein the at least one stiffening panel is configured to stiffen at least one of the front and rear panels.

7. The portable barrier unit of claim 6, wherein the front and rear panels are both stiffened by a stiffening member.

8. The portable barrier unit of claim 6, wherein the unit is configured to collapse by folding the front and rear panels toward each other.

9. The portable barrier unit of claim 1, wherein the unit has a front to back depth dimension b and a top to bottom height dimension h, and wherein the ratio of b/h is larger than 0.5 divided by the coefficient of friction defined between the portable barrier unit and the surface that it is disposed on.

10. The portable barrier unit of claim 1, wherein the unit has a front to back depth dimension b and a top to bottom height dimension h, and wherein the ratio of b/h is between about 0.9 and about 0.5.

11. The portable barrier unit of claim 10, wherein the ratio of b/h is between about 0.8 and about 0.7.

12. The portable barrier unit of claim 10, wherein the ratio of b/h is about 0.7.

13. The portable barrier unit of claim 1, wherein the unit has a front to back depth dimension b and a top to bottom height dimension h, and wherein the ratio of b/h is more than about 0.6.

14. The portable barrier unit of claim 1, wherein the two opposing sides of the inner envelope are connected by a plurality of lateral tethers to prevent a predetermined amount of physical separation of the two opposing sides of the inner envelope, wherein at least some of the plurality of lateral tethers are located proximate a central region of the two opposing sides of the inner envelope.

15. The portable barrier unit of claim 14, wherein the at least one lateral tether is attached at each end to a reinforced region of the two opposing sides of the inner envelope.

16. The portable barrier unit of claim 6, wherein the two opposing triangular side panels are connected by the at least one lateral tether to prevent a predetermined amount of physical separation of the two opposing triangular side panels, the at least one lateral tether being located proximate a central region of the two opposing triangular sides of the inner envelope.

17. The portable barrier unit of claim 16, wherein the two opposing triangular side panels are connected by a plurality of lateral tethers to prevent a predetermined amount of physical separation of the two opposing triangular side panels, wherein at least some of the plurality of lateral tethers are located proximate a central region of the two opposing triangular sides of the inner envelope.

18. The portable barrier unit of claim 16, wherein the at least one lateral tether is attached at each end to a reinforced region of the opposing triangular sides of the inner envelope.

* * * * *